USOO5561987A

United States Patent [19]
Hartfield et al.

[11] Patent Number: 5,561,987
[45] Date of Patent: Oct. 8, 1996

[54] FALLING FILM EVAPORATOR WITH VAPOR-LIQUID SEPARATOR

[75] Inventors: Jon P. Hartfield; Duane F. Sanborn, both of La Crosse, Wis.

[73] Assignee: American Standard Inc., Piscataway, N.J.

[21] Appl. No.: 452,605

[22] Filed: May 25, 1995

[51] Int. Cl.$^6$ .............................. F25B 43/02; F28F 1/32
[52] U.S. Cl. .............................................. 62/471; 165/117
[58] Field of Search .............................. 165/117; 62/219, 62/220, 221, 471

[56] References Cited

U.S. PATENT DOCUMENTS

| | | | |
|---|---|---|---|
| 2,365,878 | 12/1944 | Huff | 257/239 |
| 2,873,140 | 2/1959 | Merrick | 299/25 |
| 2,996,286 | 8/1961 | Trepaud | 257/223 |
| 3,213,935 | 10/1965 | Reid, Jr. | 165/117 |
| 3,240,265 | 3/1966 | Weller | 165/108 |
| 3,267,693 | 8/1966 | Richardson et al. | 62/527 |
| 3,304,741 | 2/1967 | Weller | 62/471 |
| 3,481,151 | 12/1969 | Seeley | 62/196 |
| 3,635,040 | 1/1972 | Morris, Jr. | 165/117 |
| 4,158,295 | 6/1979 | Sibley | 62/476 |
| 4,200,426 | 4/1980 | Linnert | 417/312 |
| 4,220,011 | 9/1980 | Bergman et al. | 62/185 |
| 4,223,537 | 9/1980 | Sanborn et al. | 62/174 |
| 4,318,368 | 3/1982 | Carson et al. | 122/34 |
| 4,479,533 | 10/1984 | Persson et al. | 165/140 |
| 4,488,855 | 12/1984 | Butterworth et al. | 417/368 |
| 4,567,942 | 2/1986 | Stafford et al. | 165/118 |
| 4,622,048 | 11/1986 | Roberts et al. | 55/199 |
| 4,730,988 | 3/1988 | Ma | 417/313 |
| 4,768,585 | 9/1988 | Hayes et al. | 165/162 |
| 4,815,533 | 3/1989 | Harada et al. | 165/159 |
| 4,829,786 | 5/1989 | Sand et al. | 62/468 |
| 4,918,944 | 4/1990 | Takahashi et al. | 62/471 |
| 4,927,339 | 5/1990 | Riffe et al. | 418/55 |
| 5,004,043 | 4/1991 | Mucic et al. | 165/118 |
| 5,036,680 | 8/1991 | Fujiwara et al. | 62/509 |
| 5,129,798 | 7/1992 | Crum et al. | 418/55 |

FOREIGN PATENT DOCUMENTS 0140788  6/1986  Japan ..................... 165/117

*Primary Examiner*—William E. Wayner
*Attorney, Agent, or Firm*—William J. Beres; William O'Driscoll; Peter D. Ferguson

[57] ABSTRACT

Compression refrigeration apparatus for removing heat from a heat load using a falling film evaporator, operated with an azeotropic refrigerant and utilizing a vapor-liquid separator, preferably inside the evaporator vessel. In one embodiment, two types of heat exchange surfaces are utilized—one for maximizing the axial distribution of refrigerant film on a heat exchange surface, the other for encouraging liquid refrigerant in contact with a heat exchange surface to boil and evaporate. The apparatus allows for efficient recovery of lubricant deposited in the evaporator without redistributing the lubricant within the evaporator.

35 Claims, 8 Drawing Sheets

FALLING FILM EVAPORATOR WITH VAPOR-LIQUID SEPARATOR

FIELD OF THE INVENTION

This invention relates generally to a falling film evaporator used in a refrigeration system. This invention more particularly relates to a falling-film evaporator for a compression refrigeration system, preferably including a vapor-liquid separator inside the evaporator vessel.

BACKGROUND OF THE INVENTION

Compression refrigeration, chilling, heat pump, and related apparatus typically employing chlorofluorocarbon (CFC), hydroflourocarbon (HFC), replacement or alternative refrigerants are known in the art. (All kinds of such apparatus will be referred to generally as a "refrigerator" here, for brevity.) The primary components of a compression refrigerator are an expansion valve, an evaporator, a compressor and a condenser, connected in that order to form a closed refrigerant loop.

In a compression refrigerator, the refrigerant may be an azeotrope. This means that the refrigerant cannot be distilled into separate components having different compositions when it is evaporated or condensed. The composition of the refrigerant in its liquid or vapor forms is identical.

The evaporator of a compression refrigerator is a specialized heat exchanger. In operation, a liquid refrigerant is distributed via an expansion valve into the evaporator. A fluid to be cooled is separately introduced into the evaporator. The fluid to be cooled carries the heat load which the refrigerant is designed to cool. The evaporator transfers heat from the heat load to the liquid refrigerant.

For example, the fluid to be cooled in the evaporator may flow through the evaporator within the runs of a bundle of pipe having a heat-conductive wall, and the liquid refrigerant entering the evaporator may be distributed on the outside of the pipe bundle. The outside of the pipe bundle can be referred to as a heat exchange surface. The conditions in the evaporator are arranged so heat is transferred from the fluid to be cooled to the refrigerant through the heat exchange surface. This heat transfer boils and/or evaporates the refrigerant, forming a refrigerant vapor.

The refrigerant vapor is exhausted from the evaporator by the pumping action of the compressor. The compressor also compresses the refrigerant, forming a more dense vapor. The compression process heats the vapor, thus preventing it from condensing at this point. The compressed vapor is then transported to the condenser, which is located between the high-pressure side of the expansion valve and the high-pressure side of the compressor.

The condenser is another specialized heat exchanger. The condenser transfers the heat resulting from compression of the refrigerant and heat load received from the evaporator to a heat sink, such as ambient air, ground water, or the like. As it cools down, the compressed vapor condenses to liquid form. Finally, the cooled, condensed refrigerant passes through the expansion valve whereupon the refrigerant pressure and temperature are reduced and the cycle is repeated.

One feature of a compression refrigerator is that, typically, the bundle of pipe carrying the heat load in the evaporator is immersed in a standing body of the liquid refrigerant. This type of evaporator is called a "flooded evaporator." U.S. Pat. No. 4,829,786 to Sand et al. is exemplary of this type of evaporator, is assigned to the assignee of the present invention, and is incorporated by reference herein.

Another characteristic of a compression refrigerator is that the oil for lubricating the compressor circulates with the refrigerant, and collects in the evaporator. This occurs because the oil is less volatile than the refrigerant. Thus, when the refrigerant leaves the evaporator as a vapor, the less-volatile oil is left behind. In a system employing a flooded evaporator, most of the lubricating oil is mixed in with the charge of liquid refrigerant in the evaporator. This oil is not a good refrigerant, interferes with heat transfer, and is prevented from carrying out its primary mission: to lubricate the compressor.

Another known type of refrigerator is an absorption refrigerator. An absorption refrigerator differs from a compression refrigerator in several respects. One difference is that an absorption refrigerator employs composite or non-azeotropic refrigerant. A second difference is that an absorption refrigerator includes a generator and an absorber in the refrigerant loop.

A variety of composite or non-azeotropic refrigerant systems can be used in an absorption refrigerator. Two examples are an ammonia/water system and a lithium bromide/water system. Non-azeotropic refrigerants are intentionally distilled into two components—a more-volatile and a less-volatile component—during operation of the refrigerator. The two components are separated in the generator, follow different paths through the apparatus, and then are recombined in the absorber.

Between the generator and absorber of an absorption refrigerator, the separated, more-volatile component of the refrigerant is routed through a condenser and evaporator which function comparably to the condenser and evaporator of a compression refrigerator. Since no lubricating oil is provided in an absorption refrigerator, lubricating oil does not tend to collect in its evaporator.

In absorption apparatus, the evaporator is a falling-film evaporator having vertical or horizontal tubes that are sprayed from a horizontal direction. The fluid to be chilled is typically conveyed through the interior of a bundle of pipe. In practice, the liquid refrigerant, typically water in an absorption system, is sprayed horizontally by a sprayer so that it contacts the outside of the pipe bundle. The bundle is arranged so the refrigerant will flow down along the heat-exchange surface from the top of the pipe bundle to the bottom. Rather than optimizing the amount of liquid refrigerant, copious amounts of the refrigerant are oversprayed on the vertical tubes. The tubing bundle can include vertical runs of pipe, horizontal runs of pipe, coils of pipe running generally circumferentially about a vertical axis, other configurations, or combinations of these.

U.S. Pat. No. 4,918,944 (Takahashi et al.) is an example of one type of falling film evaporator. Other patents which may be pertinent are U.S. Pat. No. 3,213,935 (Reid), U.S. Pat. No. 3,240,265 (Weller), U.S. Pat. No. 3,267,693 (Richardson et al.), and U.S. Pat. No. 5,036,680 (Fujiwara et al.).

Compression refrigerators may also use direct expansion (DX) evaporators where the refrigerant is within a tube and the fluid being cooled is external to the tube. The oil return mechanism in a DX evaporator differs from flooded evaporators and the DX evaporators are generally used where 50 tons or less of cooling is desired since dual circuitry or derating is required for higher tonnages.

Compression refrigerators therefore have been distinguished from absorption refrigerators by the type of refrigerant used (azeotropic versus non-azeotropic), by the mechanism used to return the refrigerant to its initial condition (i.e. mechanical compressor versus generator), by the type of evaporator employed (flooded only for a compression system versus either type for absorption), by the tendency only of compression refrigerators to undesirably collect lubricating oil in the evaporator, and in other ways.

Flooded evaporators have a number of disadvantages distinct to their design. They use more refrigerant and more lubricant than falling film systems, thereby increasing system cost. Also, the liquid refrigerant at the bottom of the evaporator vessel will only boil and evaporate at a relatively high temperature because of the hydrostatic head or pressure from the liquid refrigerant in the evaporator vessel. Because the liquid refrigerant near the bottom of the evaporator vessel will only boil at a relatively high temperature, less evaporation occurs and less heat is removed by the refrigerant. This makes the refrigerator less efficient. Further, the lubricating oil trapped in the flooded evaporator of a compression refrigerator is difficult to separate because the charge of refrigerant is turbulent in the evaporator. Turbulence tends to continuously mix the lubricant and refrigerant, interfering with their separation.

Current falling film evaporators have their own disadvantages. Many falling film evaporators deposit an excess of refrigerant on the top of the bundle to ensure complete wetting of the heat exchange surface from top to bottom. The excess liquid refrigerant that inevitably reaches the bottom of the evaporator vessel is collected in a sump, then recycled from the sump to the top of the tube bundle. Such recycling, falling film systems have been unsuitable for use with compression refrigerators because the recycling of the refrigerant would leave a relatively high proportioned mixture of entrained lubricant on the lower parts of the tube bundle and in the sump. This mixture would contain a high concentration of lubricant since most of the refrigerant in the evaporator vessel has already evaporated before reaching the bottom of the evaporator if the system is working properly. Unfortunately, recycling the lubricant-rich mixture over the heat exchange surface in such systems decreases system efficiency because the lubricant distributed heavily over the heat exchange surface reduces the ability of the system to evaporate the refrigerant. Thus, falling film evaporators, and particularly recycling falling film evaporators, have not been used in compression refrigeration systems.

Another problem is common to falling film evaporators: the precise control of liquid refrigerant distribution. Most falling film evaporators spray the liquid refrigerant onto the heat exchange surface (typically a series of tubes carrying liquid to be cooled). The sprayed liquid refrigerant tends to splash off the surface, thereby reducing the intimacy of contact between the refrigerant and the heat exchange surface. Because the refrigerant is in less-intimate contact with the heat exchange surface, it will have less chance to boil and remove heat from the liquid inside the tubes comprising the heat exchange surface. Additionally, if the heat exchange surface is a stack of horizontally disposed tubes, it is difficult to control the axial distribution of liquid refrigerant along the length of the tubes. Therefore some parts of the heat exchange surface may be cooled while others are not. Finally, droplets of the sprayed refrigerant can form a mist or aerosol in the refrigerant vapor that can be sucked into and damage the compressor of the refrigeration system.

In most compression refrigeration systems, the pressurized liquid refrigerant leaving the expansion valve is separated into liquid and vapor phases in a vapor-liquid separator outside the evaporator vessel. The liquid refrigerant is then transported via a pipe to the evaporation vessel and distributed on the heat exchange surface, while the refrigerant vapor is separately conveyed to the headspace of the evaporator.

A system having an external separator must transport the liquid refrigerant over a distance through a pipe to carry it into the evaporator vessel. Because the liquid refrigerant is near its boiling point, it is difficult to transport evenly through a pipe, for two reasons. First, the pipe has a relatively high surface area in contact with ambient air. The pipe is therefore capable of receiving ambient heat and evaporating the liquid refrigerant, forming bubbles or foam in the liquid refrigerant which can prevent the liquid refrigerant from flowing evenly within the pipe. Second, the pipe from the separator to the evaporator typically has not been a straight run. Elbows, joints, and the like in the pipe form areas where bubbles or foam can collect and interfere with efficient refrigerant distribution even more.

Also, the vapor-liquid separator takes up space outside of the evaporation vessel, increasing the total system size. Finally, systems utilizing a separate vapor-liquid separator are usually more costly because the separator vessel, like the evaporator vessel, must be built and certified to withstand high pressure.

SUMMARY OF THE INVENTION

It is an object, feature and advantage of the present invention to implement a compression refrigerator with a falling film evaporator that does not recycle lubricant within the evaporator over a heat exchange surface but instead allows lubricant to be drained directly from the evaporator.

It is an object, feature and advantage of the present invention to provide a vapor-liquid separator in a refrigeration system which does not require an independent pressure vessel.

It is an object, feature and advantage of the present invention to transport liquid refrigerant from the vapor-liquid separator to the evaporator vessel directly, instead of via a pipe or other transportation means.

It is an object, feature and advantage of the present invention to implement a refrigeration system that evaporates a refrigerant in a falling film to remove heat from a load but also efficiently evaporates any refrigerant that may settle at the bottom of the evaporator.

It is an object, feature and advantage of the present invention to implement a falling film evaporator which efficiently evaporates any residual liquid refrigerant which runs off the falling film heat exchange surface and collects at the bottom of the evaporator vessel.

It is an object, feature and advantage of the present invention to minimize the thermodynamic quality of the refrigerant provided to the distributor so as to ensure that liquid refrigerant is applied in a controlled fashion by the distributor.

One aspect of the present invention is a refrigerating system including an evaporator and a compressor. The evaporator includes a pressure vessel, a refrigerant level regulator, a body of evaporator tubes, a liquid refrigerant distributor, and a lubricant recovery system. The pressure vessel has a refrigerant input and a refrigerant output. The refrigerant level regulator maintains the top surface of a body of liquid refrigerant within the pressure vessel at a nominal elevation. The body of evaporator tubes is disposed within the pressure vessel. The body of tubes includes an upper heat exchange surface located above the nominal elevation of the refrigerant in the evaporator and a lower heat exchange surface located below the nominal elevation of the refrigerant in the evaporator.

A liquid refrigerant distributor is provided for wetting the upper heat exchange surface of the body of evaporator tubes with a refrigerant taken from the refrigerant input. The liquid refrigerant distributor also supplies an excess of refrigerant which collects in the lower part of the evaporator vessel, immersing the lower heat exchange surface of the body of evaporator tubes. The lubricant recovery system removes a lubricant-rich phase from a body of liquid refrigerant within the pressure vessel to a location outside the pressure vessel.

Such a system separates the majority of a refrigerant from a lubricant by evaporation at the upper heat exchange surface, thus concentrating the lubricant at the bottom of the evaporator where it can be easily removed from the evaporator. The above-described system also does not recycle the lubricant over the heat exchange surface within the evaporator, which would reduce the ability of the system to evaporate the "falling film" refrigerant. Additionally, the above-described system evaporates the refrigerant from a falling film at the upper heat exchange surface and from a standing pool of liquid at the lower heat exchange surface.

Another aspect of the present invention is a cooling apparatus comprising an evaporator vessel, an expansion valve, a liquid refrigerant sprayer and a refrigerant separator. The evaporator vessel has a refrigerant input, a refrigerant vapor output, a headspace, and a body of evaporator tubes disposed generally below the headspace. The expansion valve has an input and also has an output communicating with the refrigerant input of the evaporator vessel. The refrigerant separator is located within the evaporator headspace. It has a refrigerant separator input that communicates with the expansion valve output, a separation volume, a vapor output that communicates between the separation volume and the headspace, and a drain that pools liquid refrigerant and communicates between the separation volume and the liquid refrigerant sprayer. In this way, the system does not require a separate pressure vessel for the vapor-liquid separator. Such a system is less expensive than systems utilizing separate vapor-liquid separators. Additionally, such systems do not need to transport a liquid refrigerant which is easily subject to boiling to the evaporator.

DETAILED DESCRIPTION OF THE PREFERRED EMBODIMENTS

While the present invention will be described in connection with certain preferred embodiments, it will be understood that the invention is not limited to those embodiments. The present invention includes all alternatives, modifications and equivalents within the spirit and scope of the invention as defined by the appended claims.

Figure 1:
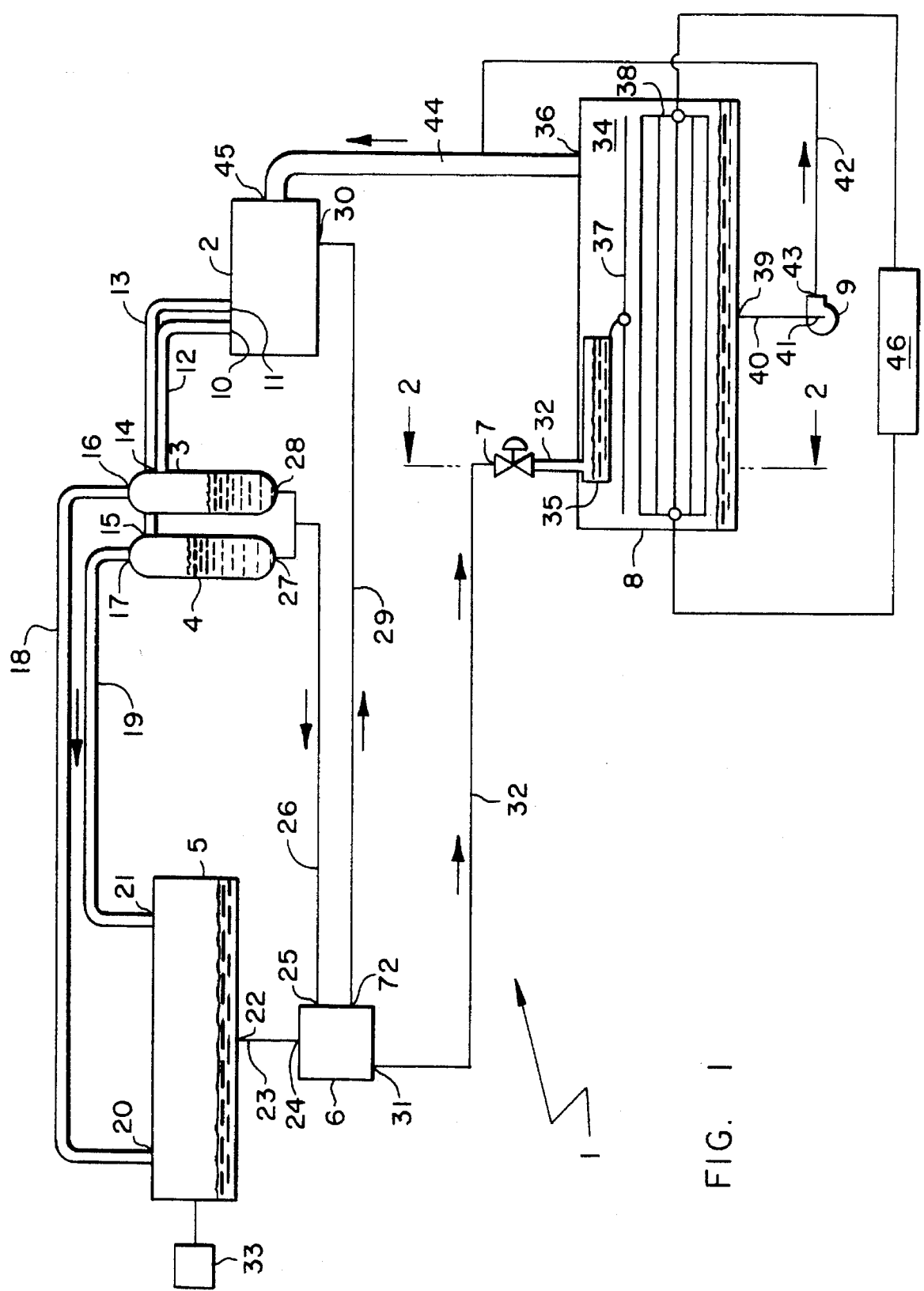
FIG. 1 is a schematic side elevation of a compression refrigeration system according to the present invention.

FIG. 1 shows a compression refrigerator system generally indicated at 1. In the preferred embodiment, the compression refrigerator 1 includes a screw compressor 2, a pair of oil separators 3 and 4, a condenser 5, a subcooler 6, an expansion valve 7, a falling film evaporator 8, and a lubricant pump 9. The outputs 10 and 11 of the screw compressor 2 are respectively connected by the vapor refrigerant lines 12 and 13 to the inputs 14 and 15 of the oil separators 3 and 4. The oil separators 3 and 4 have vapor outputs 16 and 17 connected via lines 18 and 19 to condenser inputs 20 and 21.

The condenser 5 has an output 22 that delivers condensed, liquid refrigerant to the subcooler 6 via a condenser output line 23. The subcooler 6 has the liquid refrigerant input 24 connected by the line 23 to a condenser output 22 and a liquid refrigerant output 31 connected by the refrigerant line 32 to the expansion valve 7. The subcooler 6 also includes an integral oil cooler having a lubricant input 25 connected by the line 26 to the oil separator lubricant outputs 27, 28; and an output 72 that is connected via the line 29 to the compressor lubricant input 30. Both the condenser 5 and the subcooler 6 transfer the heat removed from either the refrigerant or the lubricant to a heat sink 33. The expansion valve 7 is connected in the line 32 running to the falling film evaporator 8.

The primary components of the falling film evaporator 8 (described in more detail below in conjunction with FIG. 2) are a headspace 34, a vapor-liquid separator 35, a refrigerant vapor output 36, a spray tree distribution system 37, and a body of evaporator tubes 38. The expansion valve 7 is in fluid communication with the vapor-liquid separator 35 which, in turn, is in fluid communication with the spray tree distribution system 37. The falling film evaporator has a lubricant recovery output 39 connected by the line 40 to the input 41 of the pump 9. A lubricant recovery line 42 is connected to the output 43 of the pump 9 and leads to the refrigerant/lubricant compressor input line (suction line) 44. The refrigerant/lubricant compressor input line 44 is connected to the compressor input 45. A heat load 46, external to the falling film evaporator 8, is in fluid communication with the body of evaporator tubes 38.

Figure 2:
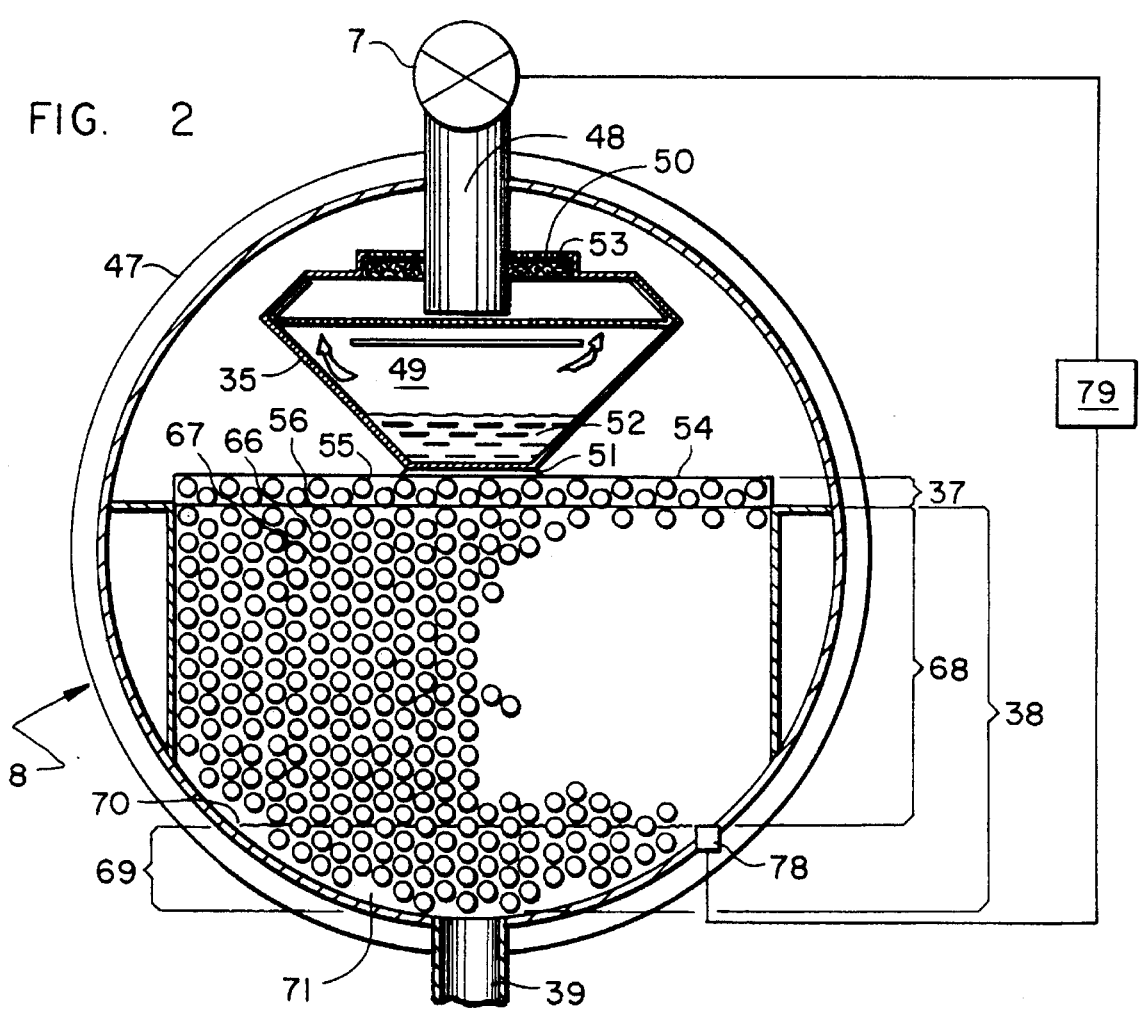
FIG. 2 is a section taken along line 2—2 of FIG. 1 of an evaporator and liquid-vapor separator assembly according to the present invention.

Turning to FIG. 2, one can see more details of the internal structure of the falling film evaporator 8. The evaporator 8 is contained in a pressure vessel 47. The pressure vessel 47 is constructed to withstand the pressure generated by the evaporation of the refrigerant in the headspace 34 and the weight and hydrostatic pressure of the deepest possible pool of liquid refrigerant that might collect at the bottom of the evaporator.

Figure 3:
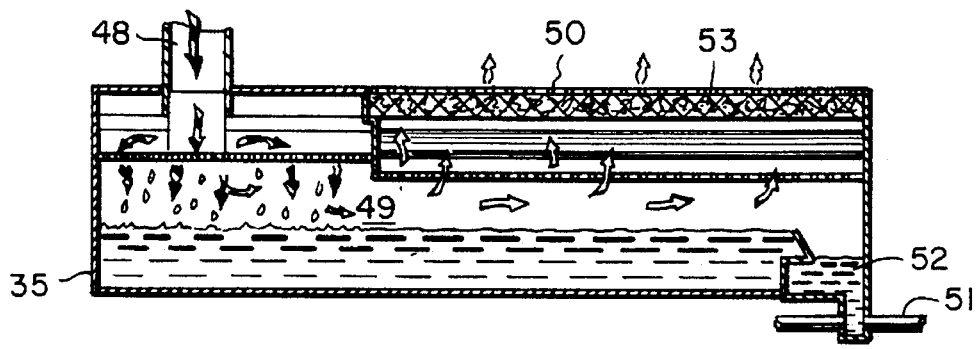
FIG. 3 is an isolated, cut-away view similar to FIG. 1 of a liquid-vapor separator.

As shown in FIGS. 2 and 3, disposed within the pressure vessel 47 is a vapor-liquid separator 35 having a refrigerant separator input 48, a separation volume 49, a refrigerant vapor output 50, and a liquid refrigerant drain 51. Returning to FIG. 2, the expansion valve 7 communicates with the refrigerant separator input 48 allowing the refrigerant to enter the separation volume 49 and separate into vapor and liquid. The vapor-liquid separator 35 preferably has a narrowing shape (in this case a "V" shape resembling an axial section of a brilliant-cut diamond). This shape provides a relatively large volume 49 in its upper portion to contain a large volume of vapor refrigerant without a pressure build-up. This shape also provides a relatively small pooling volume 52 near its bottom that is deep enough that a pool containing a small quantity of liquid refrigerant will provide a sufficient hydrostatic head to spray the liquid refrigerant.

Figure 5:
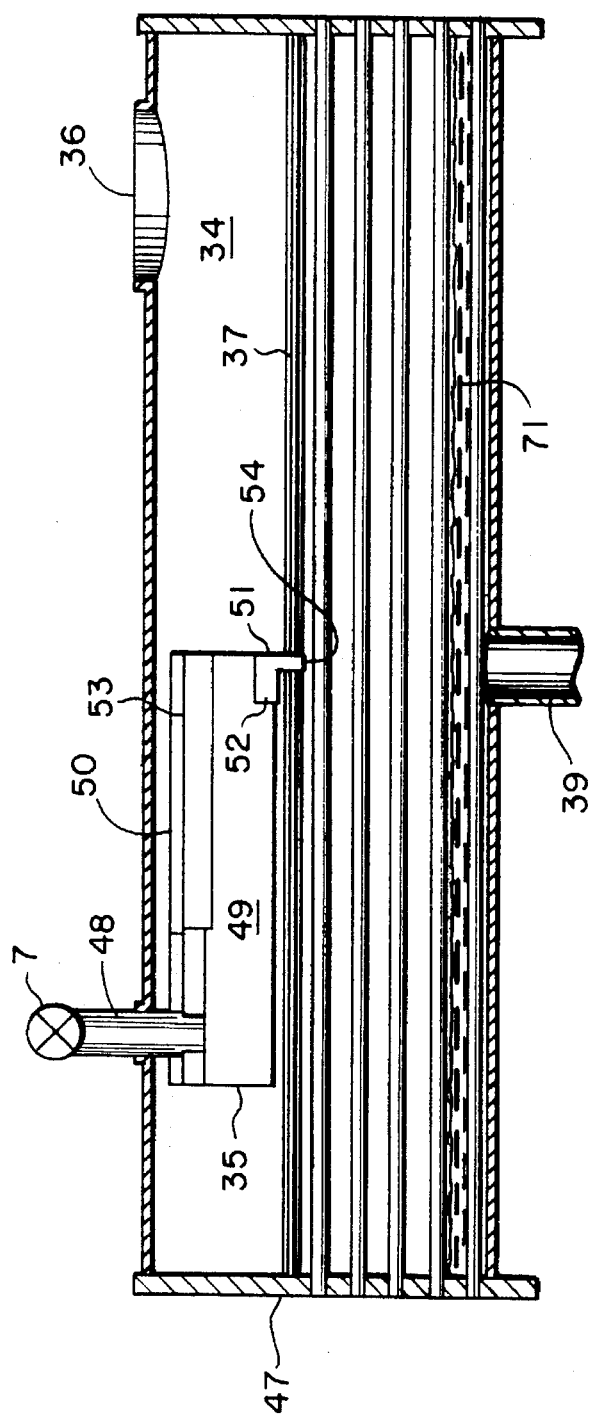
FIG. 5 is an isolated detail view similar to FIG. 1 of a evaporator and liquid-vapor separator according to the present invention.
Figure 4:
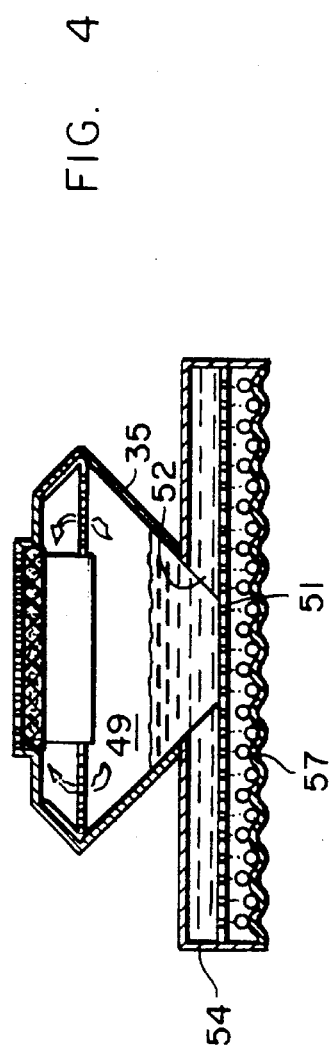
FIG. 4 is a fragmentary view similar to FIG. 2 of a liquid-vapor separator and spray tree distributor.

As best seen in FIG. 5, the vapor output 50 is located substantially horizontally distant from the refrigerant separator input 48 to allow adequate space and time for vapor refrigerant to separate from liquid refrigerant before entering the headspace 34. Additionally, the vapor output 50 of the vapor-liquid separator 35 is located substantially horizontally distant from the refrigerant vapor output 36 of the pressure vessel 47 and has a screen 53 interposed between the separation volume 49 and the headspace 34. The screen 53 captures splashes and entrained droplets of liquid refrigerant vapor and also may be dimensioned to provide a slight "back pressure" on the top of the liquid refrigerant pooling in the bottom of the vapor-liquid separator 35. This back pressure, in conjunction with the hydrostatic pressure of the standing pool held in the pooling volume 52, forces the liquid refrigerant out the drain 51 of the vapor-liquid separator 35. The hydrostatic head also permits flow of the saturated liquid out of the separator and through the distributor tubes without flashing, thus maintaining single phase flow which promotes and enhances uniform distribution to the falling film tube bundle.

Returning to FIG. 2, the drain 51 of the vapor-liquid separator 35 is in fluid communication with and positioned above a spray tree distribution system 37 which, in turn, is located above a body 38 of generally horizontal evaporator tubes containing liquid to be cooled.

Figure 6:
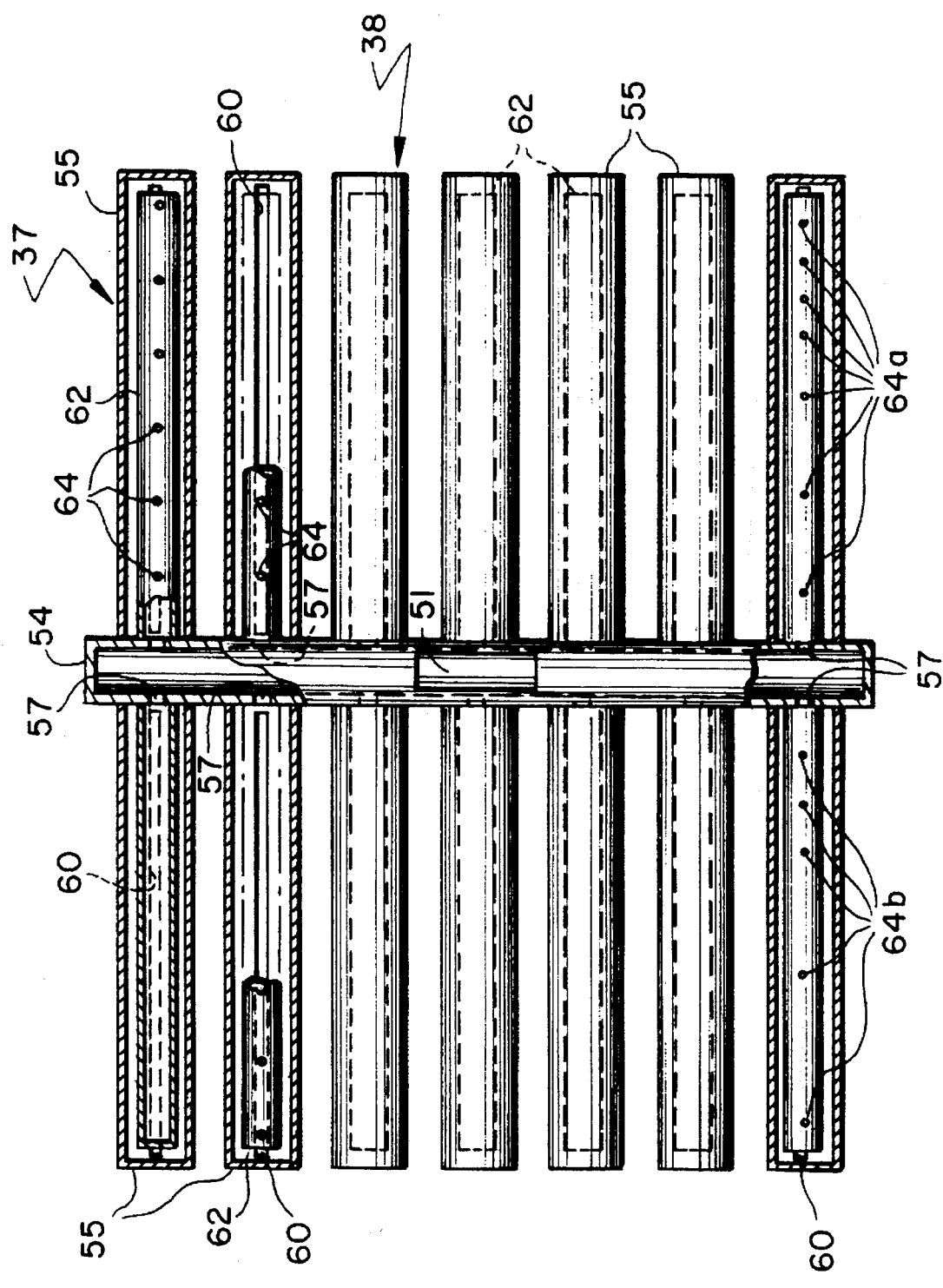
FIG. 6 is an isolated, diagrammatic top plan view of the spray tree distributor of FIG. 2.
Figure 7:
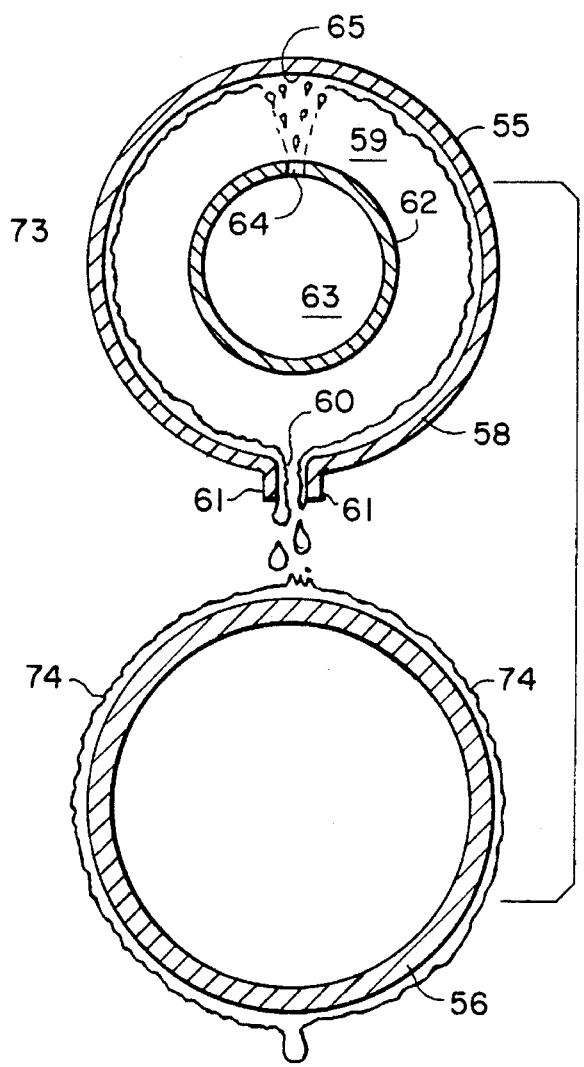
FIG. 7 is an enlarged, isolated section, oriented as in FIG. 2, of a single spray tree distribution tube and a single evaporator tube.
Figure 8A:
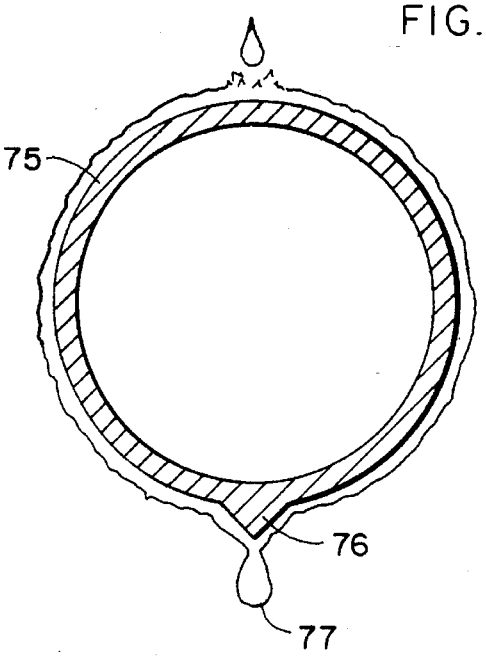
FIG. 8A is an isolated section, oriented as in FIG. 2, of a first alternative type of evaporator tube.
Figure 8B:
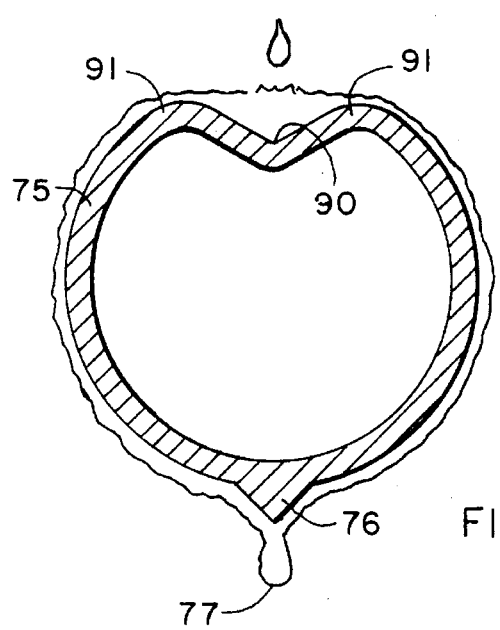
FIG. 8B is an isolated section, oriented as in FIG. 2, of a second alternative type of evaporator tube.

The spray tree distribution system 37, also shown in isolation in FIG. 6, includes a manifold 54 and a series of horizontal distribution tubes such as 55. Referring to FIGS. 2, 6, and 7, each distribution tube such as 55 lies parallel to, in close proximity to, and directly above one uppermost tube such as 56 of the body of evaporator tubes 38. The manifold 54 is in fluid communication with the horizontal distribution tubes 55 via a series of liquid input ports such as 57 shown in FIG. 6.

FIG. 7 shows more details of a horizontal distribution tube 55. The tube 55 is composed of a outer tube wall 58 enclosing an outer lumen 59. The outer tube wall 58 has a axially extending slot 60 through the outer tube wall 58 which allows fluid to drip from the outer lumen 59 onto an evaporator tube 56. The slot 60 may extend substantially the length of the tube 55. Extending at right angles along the slot 60 are two downwardly extending flanges 61 for forming falling liquid refrigerant so it will flow in substantially equal amounts down both sides of the tube 56. In an alternative embodiment, the slot 61 may be replaced with a plurality of regularly spaced apertures (not shown) arranged along the bottom of the tube 55. In such case, the flange 61 may be formed as collars (not shown).

Positioned in the outer lumen 59 is an inner tube 62 having an inner lumen 63, a liquid input port 57 (shown in FIG. 6) in fluid communication with the manifold 54, and a series of axially spaced orifices such as 64 providing communication between the inner lumen 63 and outer lumen 59. The orifice 64 is sized to spray the liquid refrigerant supplied via the inner lumen 63 against the inner wall 65.

Multiple embodiments such as nozzles, openings, or flanges can be used in place of the orifices 64. Similarly, a single slit or opening can be used in place of multiple orifices 64. Also, as many refrigerant spray orifices 64 as necessary may be used to distribute liquid refrigerant axially along the interior surface 65 of the distribution tube. Similarly, the refrigerant spray need not be directed at the interior surface directly above the inner tube 62. The refrigerant spray can be directed at a side wall or at the axially extending slot 60 instead. Additionally, the spacing of the spray orifices 64 can be either equidistant or irregularly spaced, depending on the refrigerant flow characteristics within the inner tube 62. Under some conditions, a closer spacing of the orifices 64 as the distance from the liquid input port 57 increases may be desired. This is illustrated as orifices 64A in FIG. 6. Under other conditions, a closer spacing of the orifices 64 as the distance from the liquid input port 57 decreases may be desired. This is illustrated as orifices 64B in FIG. 6.

FIG. 2 shows that the body of evaporator tubes 38 is arranged as a series of vertical stacks of horizontally disposed runs such as 56, 66, and 67 of tubing. Each vertical stack has an uppermost member such as 56 which lies below a distribution tube 55.

The body 38 of evaporator tubes is preferably homogenous but may be divided into an upper heat exchange surface 68 and a lower heat exchange surface 69. The upper heat exchange surface 68 operates in a falling film mode where each tube 56, 66, 67 is exposed to a supply of refrigerant in excess of that which the particular tube can boil. Thus excess refrigerant is provided to each tube in the upper heat exchange surface 68, and the excess refrigerant pools around the lower heat exchange surface 69. In conventional falling film evaporators, the excess refrigerant pools at the bottom of the falling film evaporator where the pooled refrigerant is recirculated back to the entrance of the falling film evaporator by a pump. That recirculated refrigerant is then included in the spray on the tubes. In a mechanical compressor having a mixture of refrigerant and lubricant, such an arrangement increases the percentage of lubricant, in the falling film evaporator since the lubricant does not escape the falling film evaporator in vaporous form. This is overcome in the present invention by adding the lower heat exchange surface 69, which resides in the pool 71, with sufficient capacity to boil the excess refrigerant supplied to the bottom row of tubes to maintain optimum performance and allow concentrated lubricant to be removed through the lubricant recovery outlet 39. Thus, the present invention does not require a recirculating pump.

The upper heat exchange surface 68 is composed of the outer surfaces of the tubes such as 56, 66, and 67 that are located above the nominal level 70 of the pool 71 of refrigerant and lubricant at the bottom of the pressure vessel 47 and constitute at least 75% of the total volume or area of heat transfer surface. The tubes comprising the upper heat exchange surface 68 are preferably grooved with either horizontal or helical striations. These grooves help distribute falling liquid refrigerant along the horizontal axes of the tubes, maximizing the amount of contact between the refrigerant and the heat exchange surface. This allows the refrigerant the maximum time to evaporate and remove heat. Tubing such as that sold under the trade name WOLVERINE Turbo BII is manufactured with appropriate grooves and can be used for the tubes that comprise the upper heat exchange surface 68. However, Turbo BII is an optimal tube for a flooded evaporator which has not been optimized for use in a falling film evaporator. The outer surface of the tubes of the upper heat exchange surface 68 are preferably optimized for heat exchange with a thin film of refrigerant.

The lower heat exchange surface 69, in contrast to the upper heat exchange surface 68, is composed of the outer surfaces of the tubes located below the nominal level 70 of the pool 71 and constitutes at most 25% of the total area or volume of heat transfer surface. There should be enough tubes in the lower heat exchange surface 69 to boil away the excess refrigerant from the upper heat exchange surface 68. Preferably, there should be twice as many tubes in the lower heat exchange surface 69, as there are in the bottom row of the upper heat exchange surface 68. Again, because the system is not hundred percent efficient in separating refrigerant from lubricant, the pool 71 is composed of both liquid refrigerant and lubricant. Under optimal conditions, the proportion of liquid refrigerant should be small compared to the amount of lubricant in the pool 71. The outer surfaces of the tubes comprising the lower heat exchange surface 69 can be rough to encourage the liquid refrigerant that is in contact with the lower heat exchange surface 69 to nucleate and boil. Such boiling further concentrates the lubricant in the pool 71 while contributing to refrigeration. Tubing such as that sold under the trade name Wolverine Turbo BII is manufactured with appropriate grooves and can be used for the tubes that comprise the lower heat exchange surface 69. This tubing is near optimum for heat exchange with a thick film of refrigerant such as is found in the pool 71.

Referring mostly to FIG. 1, the refrigerator of FIGS. 1–8 operates as follows. The azeotropic refrigerant vapor entering the input 45 of the compression refrigerator 1 is adiabatically compressed by the screw compressor 2, leaving it in denser vapor form and causing it to heat up. The compressed, heated vapor is transported via the refrigerant vapor lines 12, 13 from the compressor outputs 10, 11 to the inputs 14, 15 of the oil separators 3, 4.

The oil separators 3, 4 separate the lubricant from the compressed refrigerant (to a large degree). The separated lubricant leaves the oil separators 3, 4 via the lubricant outputs 27, 28 and is transported to the subcooler 6 via the subcooler line 26 where it is cooled, then returned to the screw compressor 2 at the lubricant input 30. In contrast, the heated, relatively dense refrigerant vapor leaves the oil separators 3, 4 via two outputs 17, 16 and is transported via lines 18, 19 to the condenser 5. In the condenser 5, the vapor is condensed into a liquid by cooling it. The heat 53 removed from the refrigerant by condensing it is transferred to the heat sink 33. The cooled liquid refrigerant then exits the condenser 5 via the condenser output 22 and is transported to the subcooler 6 via the output line 23.

In the subcooler 6, the liquid refrigerant from the condenser 5 and the lubricant from the oil separators 3, 4 separately undergo additional cooling. The lubricant exits the subcooler 6 at the subcooler output 72 and is carried to the compressor lubricant input 30 via the subcooler line 29. The subcooler lines 29 and 26 connecting the oil separators 3, 4, the subcooler 6, and the screw compressor 2 define the primary lubrication circuit. This circuit is responsible for ensuring the compressor works smoothly with a tight seal as it compresses vapor refrigerant.

Because the oil separators 3, 4 are not one hundred percent efficient, a mixture of refrigerant and carried over lubricant (predominantly refrigerant) successively enters the condenser 5, the subcooler 6, the expansion valve 7, and the evaporator 8.

Referring now to FIG. 2, within the falling film evaporator 8 the vapor and liquid refrigerant components entering the evaporator 8 are separated in the vapor-liquid separator 35. Referring to FIG. 1, the vapor component of the entering refrigerant leaves the falling film evaporator 8 directly via the refrigerant vapor output 36 and is carried to the compressor input 45 via the refrigerant/lubricant compressor input line 44.

Referring to FIGS. 2, 6, and 7, the liquid component of the entering refrigerant is distributed by the spray tree distribution system 37 onto the body 38 of evaporator tubes.

The spray tree distribution system 37 operates as follows. Liquid refrigerant from the pooling volume 52 exits the drain 51 of the vapor liquid separator 35 and is distributed through the horizontal distribution tubes 55 via the manifold 54. As seen in FIGS. 5 and 6, the drain 51 and manifold 54 are located at the center of the spray tree distribution system 37. This ensures the most uniform distribution of liquid refrigerant through the horizontal distribution tubes 55.

Turning to FIGS. 6 and 7, the liquid refrigerant that is under pressure from the vapor-liquid separator 35 flows through the manifold 54 and the liquid input port 57 into the inner lumen 63 and sprays onto the interior surface 65 of the horizontal distribution tube 55. The liquid then runs down both sides of the interior surface 65 of the horizontal distribution tube 55 in the form of a film 73 and out the axially extending slot 60 as described above. This embodiment prevents splashing and misdirection of liquid refrigerant as it is distributed onto the evaporator tubes below.

In the present invention, liquid refrigerant will form droplets within the axially extending slot 60 and slowly drip down the downwardly extending flanges 61 to impact upon a top-most evaporator tube 56. The use of two flanges 61 encourages the formation of two refrigerant droplets that will impact the evaporator tubes and slide down opposite sides of the tubes, covering as much of the tube surface as possible with a film 74. This embodiment provides an efficient and equal distribution of liquid refrigerant within the falling film evaporator 8. In a first alternative embodiment of the present invention (shown in FIG. 8A), the evaporator tube 75 may have a ridge shaped as a V-point 76 or a series of nodes shaped as a V-point 76 to encourage the formation of a single droplet 77 at the center and bottom of the tube. This V-point 76 may be knurled during manufacture of the tube 56, or affixed by welding, brazing or the like. A second alternative embodiment, (shown in FIG. 8B) contemplates a tube having a heart-shaped cross-sectional shape where a V-point 76 functions as in the first alternative embodiment, and where liquid refrigerant pools in a notch 90 between the lobes 91 of the heart shaped tube 56. The notch 90 may be formed by knurling the tube 56.

As shown in FIG. 2, the liquid refrigerant that drips from each horizontal distribution tube such as 55 falls onto the top-most evaporator tube 56 of a vertical column of evaporator tubes 56, 66, 67, etc. The liquid refrigerant is in the form of a falling film. It first falls on the top-most evaporator tube 56. Part of the refrigerant film evaporates, carrying away heat from the liquid to be cooled inside the evaporator tube 56. The refrigerant that does not evaporate falls onto the next tube below, in this case, the tube 66. Again, any of the refrigerant that does not evaporate falls onto the next topmost tube 67, and the process continues as the ever-diminishing flow of liquid refrigerant flows toward the bottom of the falling film evaporator 8.

The refrigerant that evaporates once it comes into contact with the evaporator tubes forms a vapor which leaves the falling film evaporator 8 via the refrigerant vapor output 36 where it is transported to the screw compressor 2 via the refrigerant/lubricant compressor input line 44.

The refrigerant that does not evaporate as it comes into contact with the evaporator tubes, as well as any lubricant carried over in the liquid refrigerant, forms a pool 71 at the bottom of the pressure vessel 47. A conventional, commercially level sensor 78 monitors the depth of the pool 71. A controller 79, such as that sold by the Trane division of American Standard Inc. under the trademark UCP or UCPII, is responsive to the level sensor 78 and throttles the flow of two-Phase refrigerant through the expansion valve 7. If the level sensed by the level sensor 78 is too high, the controller 79 closes the expansion valve 7 back, thereby reducing the rate of introduction of the two-phase refrigerant into the falling film evaporator 8. If the level sensed by the level sensor 78 is too low, the controller 79 opens the expansion valve 7, thereby increasing the rate of introduction of the two-phase refrigerant into the falling film evaporator 8. The controller 79 can be used to continuously adjust the amount of the two-phase refrigerant entering the falling film evaporator 8 to keep the pool 71 of refrigerant and lubricant at a nominal level 70 most or all of the time.

Unlike the body of liquid refrigerant in a typical immersion evaporator, the pool 71 of lubricant at the bottom of the evaporator 8 is not normally turbulent. The pool 71 is less turbulent than the pool of a flooded evaporator because most of the refrigerant evaporates before reaching the pool 71. Comparatively less boiling occurs from the pool 71 than occurs in a flooded evaporator. There is enough boiling to vaporize much of the liquid refrigerant to result in a lubricant-rich mixture.

Therefore, a pump 9 (see FIG. 1) is able to pump the lubricant rich mixture out of the pressure vessel 47 through a lubricant recovery output 39 and circulate the lubricant back to the screw compressor 2 through the refrigerant/lubricant compressor input 44. The lubricant rich mixture leaves the falling film evaporator 8 via the lubricant recovery output 39. The lubricant is transported via the line 40 to the pump input 41. The pump 9 pumps the lubricant out its output 43 through the lubricant recovery line 42 and into the refrigerant/lubricant compressor input line 44, thus completing the refrigeration circuit. The drained lubricant is remixed with the refrigerant at line 44 and then fed to the compressor. Alternatively, the drained lubricant can be fed directly to the compressor lubricant input 30.

In an alternative embodiment of the present invention, the liquid refrigerant is distributed upon the body of evaporator tubes 38 in a different way. Instead of utilizing the spray tree distribution system described above, the alternative embodiment uses a traditional spraying system, but instead of spraying liquid refrigerant directly onto the evaporator tubes, the spray system sprays the liquid refrigerant onto one or more mesh screens. The primary components of the alternative embodiment are shown in FIGS. 9 and 10.

Figure 9:
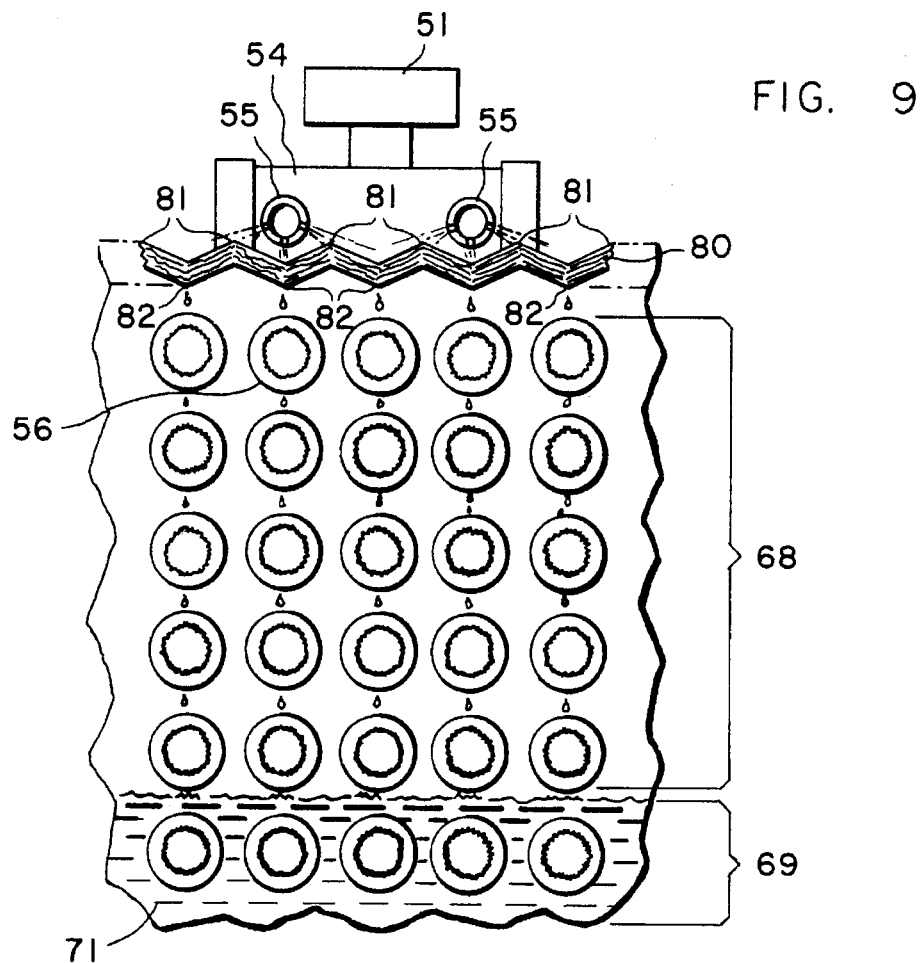
FIG. 9 is a diagrammatic section of an alternative embodiment of the spray tree distributor of FIG. 2.

Many of the components in FIG. 9 are the same as those shown in the previous figures detailing the preferred embodiment. The liquid refrigerant flows from the drain 51 of the vapor-liquid separator (not shown), through a manifold 54 and out a tree of horizontal distribution tubes 55. The horizontal distribution tubes 55 spray the liquid refrigerant onto a mesh screen 80 that is adapted to pass liquid and vapor refrigerant. As shown in both FIGS. 10 and 9, the mesh screen 80 is corrugated or waved, forming generally parallel peaks 81 and valleys 82.

Figure 10:
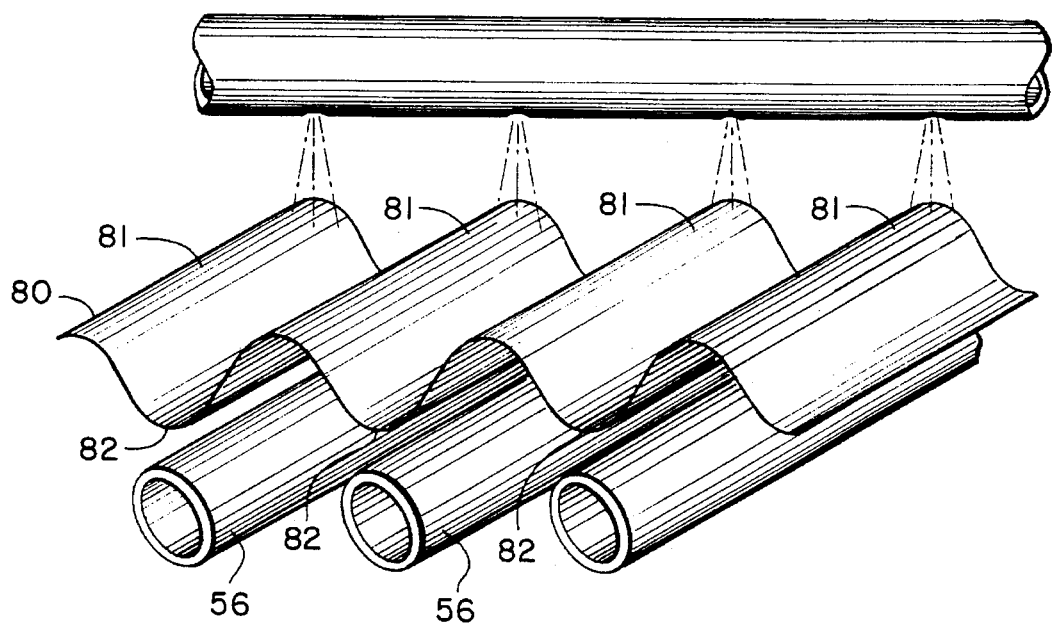
FIG. 10 is a diagrammatic, perspective, detail view of an alternate embodiment of the spray-tree distributor of FIG. 4.

Referring particularly to FIG. 10, the mesh screen 80 is positioned so that each valley 82 is generally parallel with and located directly above one of the uppermost evaporator tubes such as 56 of the upper heat exchange surface 68 (FIG. 9). The mesh screen 80 can either touch or be in close proximity with the top-most evaporator tubes of the upper heat exchange surface 68. In the arrangement of FIG. 10, a liquid refrigerant spray impacts the mesh screen 80 and pools of liquid refrigerant flow and adhere to the valleys 82 of the mesh screen 80. The pools of liquid refrigerant grow axially along the valleys 82 until gravity overcomes the surface attraction force which suspend the liquid refrigerant on the mesh screen 80 surface. The liquid refrigerant then falls as drops onto the uppermost evaporator tubes such as 56 of the upper heat exchange surface 68 (see FIG. 9). In the case where the mesh screen 80 is actually touching the evaporator tubes, the pooled liquid refrigerant flows onto the tube.

Droplets of refrigerant liquid entrained in refrigerant vapor are captured in the mesh screen 80 and contribute to the pools of liquid refrigerant that form in the valleys 82 of the screen. The refrigerant vapor, however, flows upward through the open mesh without any substantial impediment to pass from the body 38 of evaporator tubes to the vapor outlet 36. The pitch or "fineness" of the mesh screen can range from 6 to 16 wires per inch, using 0.010–0.040 in. diameter wire and constructed of steel, copper, aluminum or the like.

Figure 11:
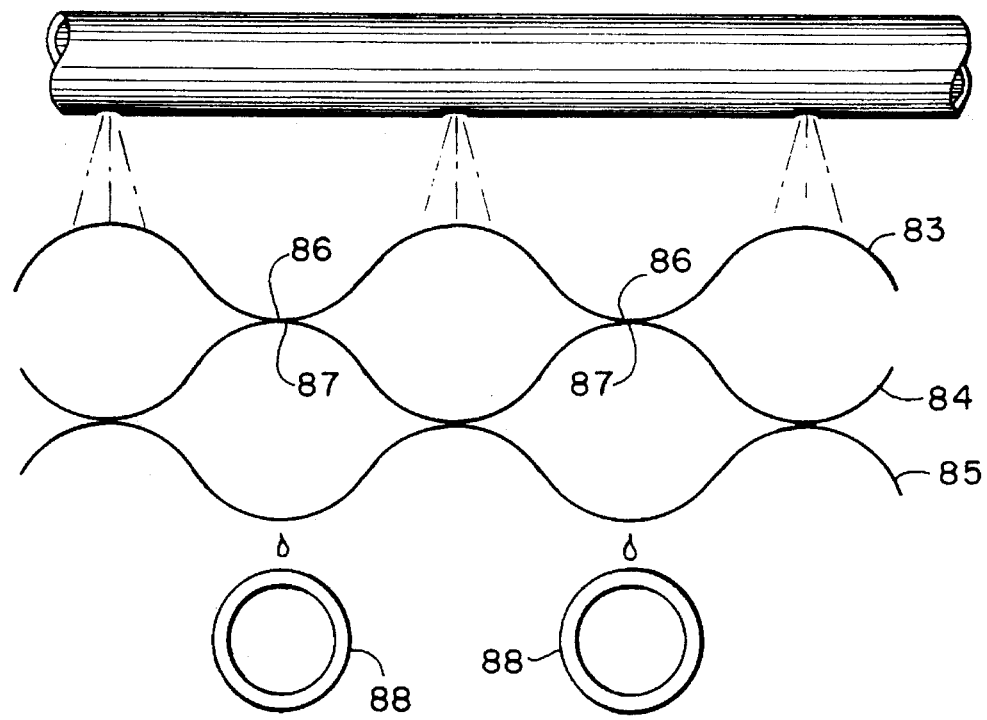
FIG. 11 is an isolated cutaway diagrammatic view of an alternative embodiment of the mesh screen arrangement of FIG. 10.
Figure 12:
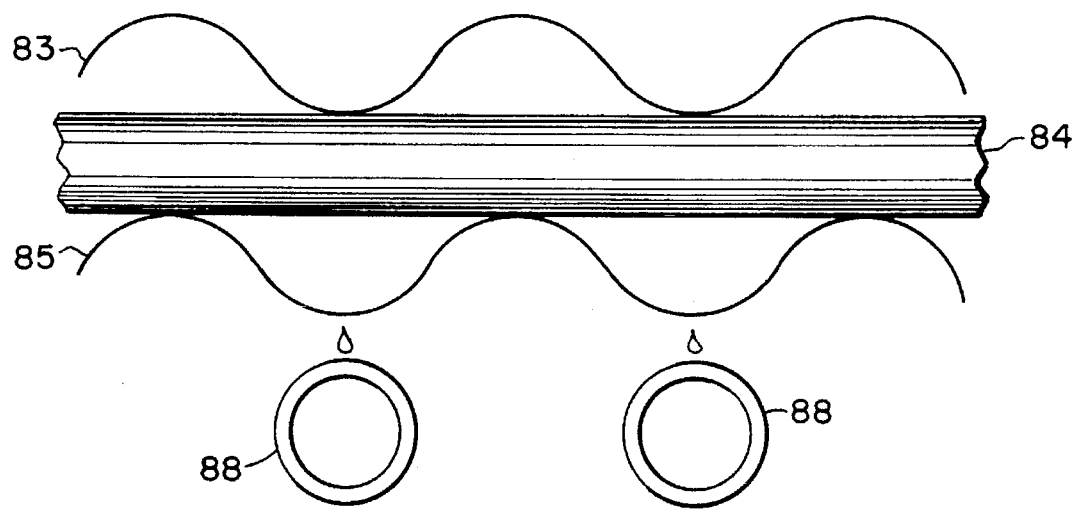
FIG. 12 is a view, similar to FIG. 11, of still another embodiment of the mesh screen arrangement of FIG. 10.

In other embodiments, illustrated in FIGS. 11 and 12, multiple mesh screens 83, 84, and 85 are interposed between the horizontal distribution tubes 55 and the upper heat exchange surface 68. The screens may be of the same or varying pitch and may be arranged to support each other. If the screens have varying pitch, it is desirable that the uppermost screen or screens have a higher or more dense pitch than the screens closest to the body of evaporator tubes. This arrangement encourages the formation of large droplets of liquid refrigerant and increases the amount of liquid refrigerant flow near the body of evaporator tubes. Also, referring to FIG. 11, in the case of multiple mesh screens 83, 84, 85, the valleys 86 of one mesh screen should be adjacent to the peaks 87 of an adjacent but lower mesh screen in order to minimize refrigerant splashing and ease the gentle flow of refrigerant through the mesh screens to the body of evaporator tubes (the topmost row of such tubes shown as 88). Alternatively, the peaks and valleys of one or more mesh screens may be skewed with respect to the peaks and valleys of adjacent mesh screens. FIG. 12 shows such an alignment for three such mesh screens 83, 84, 85, which are respectively arranged orthogonally. In either embodiment, the lower screens 85 and 84 support the screens above them, reducing or eliminating the need for external bracing.

Figure 13:
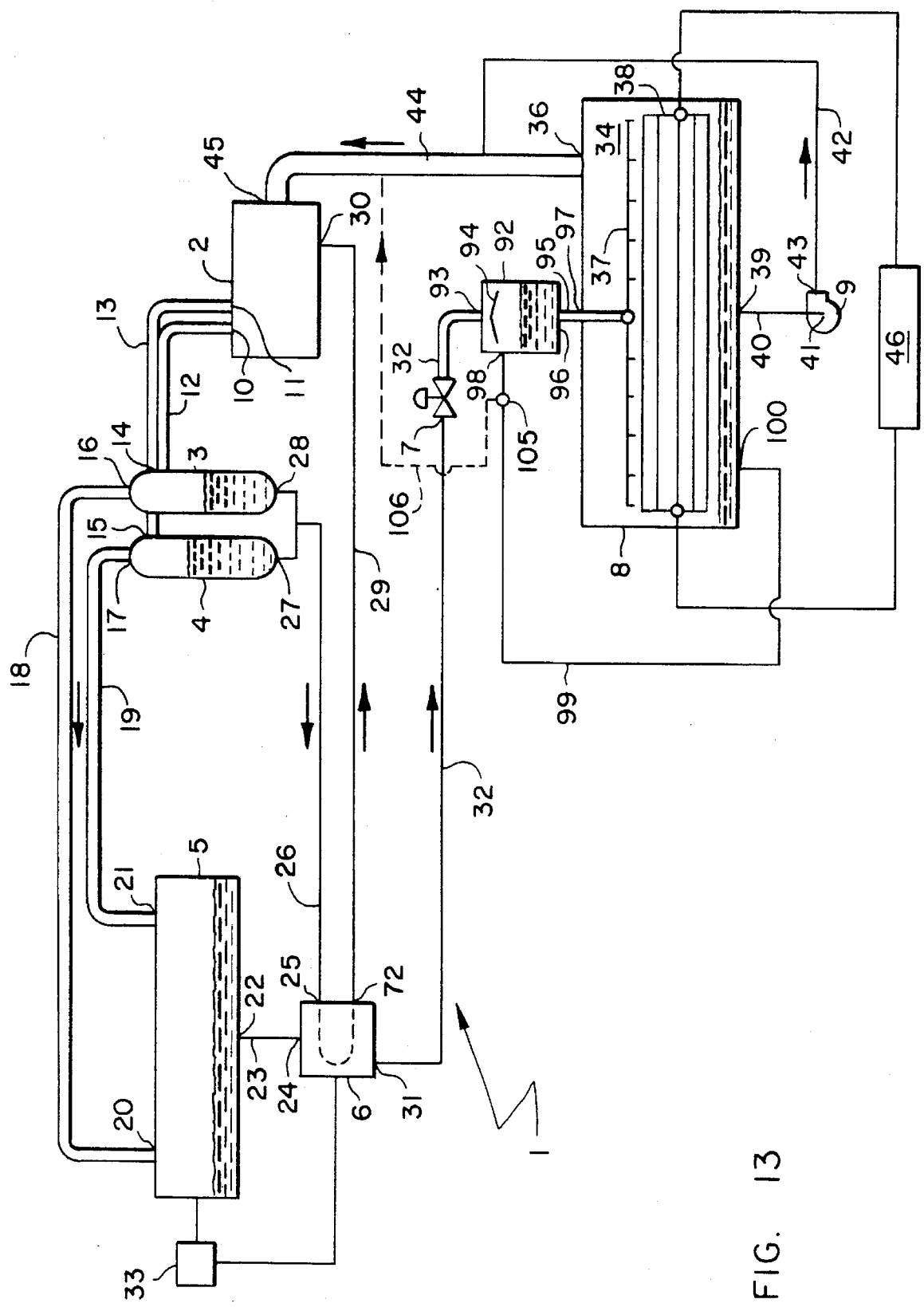
FIG. 13 is a schematic side elevation of an alternative embodiment of FIG. 1.

FIG. 13 is an alternative embodiment of the present invention where the evaporator 8 includes an external vapor liquid separator 92. In describing this alternative embodiment, the reference numerals of FIG. 1 are used to describe similar features. In this alternative embodiment, the expansion valve 7 connected by the line 32 to the vapor-liquid separator 92 at an inlet port 93 of the vapor-liquid separator 92. The vapor-liquid separator 92 is a conventional separator where a barrier 94 is used to cause separation of the liquid and vapor refrigerant. The liquid refrigerant pools in the lower portion of the vapor-liquid separator 92 where it is conveyed by a line 95 from a liquid outlet 96 of the vapor-liquid separator to the inlet 97 of the evaporator 8 and thence to the spray tree distribution system 37. Refrigerant vapor exits the vapor-liquid separator 92 by means of a vapor outlet 98 and is conveyed by a line 99 to an evaporator vapor inlet 100 located proximate the lower heat exchange surface 69 and below the nominal level 70 of the pool 71 so that the vapor agitates the mixture of refrigerant and lubricant in the pool 71. Since the agitation causes more refrigerant to contact the lower heat exchange surface 69, this further enhances the concentrated lubricant by increasing the vaporization of the liquid refrigerant. As before, the concentrated lubricant is removed by the lubricant recovery outlet 39, this outlet 39 being preferably located longitudinally distant from the inlet 100.

FIG. 13 shows a further alternative embodiment where the vapor from the vapor-separator 92 is only conveyed to the evaporator vapor inlet 100 when the system 1 is at part load conditions. At full load conditions, a valve 105 diverts the vapor to the compressor input line 44 by evaporator bypass line 106. This effectively fools the system 1 into bringing the same amount of refrigerant into the evaporator 8 at both full and part load, and provides improved distribution with smaller distribution tubes in a smaller evaporator.

The present invention and alternative embodiments disclose a compression refrigerator utilizing a falling film evaporator with a vapor-liquid separator is disposed within the evaporator. The system operates by spraying a refrigerant onto a surface or a mesh screen and allowing the refrigerant to drip onto a heat exchange surface.

The present invention maximizes the amount of contact between the liquid refrigerant and the heat exchange surface while minimizing refrigerant splashing and the amount of refrigerant sucked into the compressor. The present invention also efficiently evaporates the refrigerant that falls as a film over the heat exchange surface, as well as the refrigerant that pools at the bottom of the evaporator. In addition, the present invention allows for efficient recovery of lubricant deposited in the evaporator without redistributing the lubricant within the evaporator. Finally, the present invention does not require an independent pressure vessel for the vapor-liquid separator but instead transports liquid refrigerant from the vapor-liquid separator directly to the evaporator.

Although the preferred embodiment is described in terms of a helical rotary (or 'screw') compressor such as sold by the Trane division of American Standard Inc. under the trademark "Series R" or shown in U.S. Pat. No. 4,622,048 to Roberts et al., the invention applies to mechanical compressors having refrigerant and lubricant mixtures. For example, this includes any mechanical compressors such as scroll compressors sold by the Trane division of American Standard Inc. under the trademark "3-D" or such as shown in U.S. Pat. No. 4,488,855 to Butterworth et al. or U.S. Pat. No. 4,927,339 to Riffe et al; centrifugal compressors such as sold by the Trane division of American Standard Inc. under the trademark "CenTraVac" or as shown in U.S. Pat. No. 4,223,537 to Sanborn et al. or U.S. Pat. No. 4,220,011 to Bergman et al; and reciprocating compressors such as sold by the Trane division of American Standard Inc. under the trademark "Climatuff" or as shown in U.S. Pat. No. 4,730,988 to Ma or U.S. Pat. No. 4,200,426 to Linnert or the like.

These patents are assigned to the assignee of the present invention and are hereby incorporated by reference. Co-rotational scroll compressors such as that shown in U.S. Pat. No. 5,129,798 to Crum et al. are also contemplated, this patent also being incorporated by reference.

What is claimed as Letters Patent of the United States are:

1. An evaporator comprising:

a flooded evaporator portion;

a falling film evaporator portion;

a housing including an upper portion defining the falling film evaporator portion and a lower portion defining the flooded evaporator portion;

a first set of heat transfer tubes arranged in the upper portion of the housing and having enhancements maximizing heat transfer with a thin film; and a second set of heat transfer tubes arranged in the lower portion of the housing and having enhancements to maximize heat transfer with a thick film.

2. The heat exchanger of claim 1 wherein the first set of heat transfer tubes constitutes at least about 75% of an interior volume of the housing and the second set of heat transfer tubes constitutes at most about 25% of the interior volume of the housing.

3. The evaporator of claim 1 further including:

an input port in the housing accepting a vapor-liquid mixture;

a separator having an inlet, a vapor outlet and a liquid outlet, and adapted to receive a vapor-liquid mixture from the housing input port, at the separator inlet and being operable to separate the mixture into a vapor and a liquid and provide the vapor to the vapor outlet and provide the liquid to the liquid outlet.

4. The evaporator of claim 3 further including a distributor operably connected to the separator liquid outlet and adapted to receive liquid therefrom and to distribute the liquid to the first set of heat transfer tubes;

wherein the separator minimizes the thermodynamic quality of the refrigerant provided to the distributor so as to ensure the refrigerant is applied in a controlled fashion by the distributor.

5. The evaporator of claim 4 wherein the liquid comprises a mixture of refrigerant and lubricant and wherein the evaporator includes a pool at a lower portion operable to accumulate the mixture; and wherein the second set of heat transfer tubes are located in said pool and act to increase the lubricant concentration in the pool while decreasing the refrigerant concentration so as to form a lubricant rich solution.

6. The evaporator of claim 5 further including an inlet operably connected to the liquid refrigerant pool wherein the separator is external of the housing and the separator vapor outlet.

7. The evaporator of claim 5 further including an evaporator outlet, and a pool inlet operably connected to the liquid refrigerant pool, wherein the separator is external of the housing and the separator vapor outlet is connected to the evaporator outlet under full load conditions and is connected to the pool inlet under part load conditions.

8. The evaporator of claim 5 wherein the separator is located within the housing and including a line operably connected from the housing input port to the separator inlet.

9. The evaporator of claim 8 further including:

a refrigerant vapor output, a headspace, and a body of the first and second heat transfer tubes disposed generally below said headspace; and wherein the separator is disposed within said headspace and has a separation volume:

wherein the vapor outlet of the separator communicates between said separation volume and said headspace; and wherein the separator includes a drain which pools liquid refrigerant and communicates between said separation volume and said distributor.

10. The evaporator of claim 9 wherein the drain is located above the distributor and fills the distributor with refrigerant via gravity.

11. The evaporator of claim 9 wherein the vapor outlet of the separator has a screen disposed between the separation volume and the headspace wherein the screen provides a back pressure in the separation volume forcing refrigerant through the drain and the distributor.

12. The evaporator of claim 11 wherein the back pressure is such that liquid refrigerant is forced through the drain and distributor and flashing is minimized.

13. The evaporator of claim 11 wherein the drain is located substantially near a center of the distributor.

14. The evaporator of claim 9 further including a drain volume wherein the separation volume is significantly larger than the drain volume.

15. The evaporator of claim 9 wherein the refrigerator separator inlet is located substantially horizontally distant from the vapor outlet of the refrigerant separator.

16. The evaporator of claim 9 wherein the vapor outlet of the separator is located substantially horizontally distant from the refrigerant vapor output of the evaporator.

17. The evaporator of claim 1 further including:

an input port in the housing accepting a vapor-liquid mixture;

a separator having an inlet, a vapor outlet and a liquid outlet, and adapted to receive a vapor-liquid mixture from the housing input port at the separator inlet, and being operable to separate the mixture into a vapor and a liquid, and provide the vapor to the vapor outlet and provide the liquid to the liquid outlet;

a refrigerant vapor output;

a headspace;

a body of the first and second heat transfer tubes disposed generally below said headspace; and wherein the separator is disposed within said headspace and has a separation volume:

wherein the vapor outlet of the separator communicates between said separation volume and said headspace; and wherein the separator includes a drain which pools liquid refrigerant and communicates between said separation volume and said distributor.

18. The evaporator of claim 18 wherein the separator has a narrowing 'V' shape resembling an axial section of a brilliant-cut diamond.

19. The evaporator of claim 1 wherein the first set of heat transfer tubes comprises:

a cylindrical or elliptical tube having an arbitrary downside; and a drip enhancing formation integral with or affixed to the downside portion of the tube.

20. The evaporator of claim 19 where the drip enhancing formation has a V-pointed cross-sectional shape where the V points in the downside direction.

21. The evaporator of claim 20 where the drip enhancing formation extends continuously and linearly substantially the longitudinal length of the tube.

22. The evaporator of claim 21 wherein the cylindrical or elliptical tube has a heart shaped cross-section.

23. The evaporator of claim 20 wherein the drip enhancing formation includes a series of nodes linearly arranged substantially along the longitudinal downside portion of the heat transfer tube.

24. The evaporator of claim 23 where the nodes are generally conical in shape.

25. A falling film evaporator comprising:

a pressure vessel;

a vapor-liquid separator positioned in said pressure vessel;

a liquid distributor assembly positioned in said pressure vessel which communicates with said vapor-liquid separator; and a plurality of generally horizontal evaporator tubes positioned in said pressure vessel and under said liquid distributor assembly such that fluid may flow from said vapor-liquid separator, through said liquid distributor assembly and fall onto said evaporator tubes;

wherein the vapor-liquid separator has a narrowing 'V' shape resembling an axial section of a brilliant-cut diamond.

26. The falling film evaporator of claim 25 further comprising a control system for maintaining said refrigerant in said pressure vessel at a nominal level.

27. The falling film evaporator of claim 26 wherein said evaporator tubes define an upper heat exchange surface and a lower heat exchange surface, said upper heat exchange surface being located above said nominal level of refrigerant.

28. The falling film evaporator of claim 27 wherein said evaporator tubes defining said upper heat exchange surface have an outer surface which is grooved.

29. The falling film evaporator of claim 27 further including:

a headspace;

wherein the plurality of evaporator tubes are disposed generally below said headspace;

wherein the vapor-liquid separator is disposed within said headspace and has a separation volume;

wherein the vapor outlet of the separator communicates between said separation volume and said headspace; and wherein the separator includes a drain which pools liquid refrigerant and communicates between said separation volume and said distributor.

30. A cooling system comprising:

a compressor having an inlet and an outlet;

a condenser having an inlet operably connected to the compressor outlet and an outlet;

an expansion valve having an inlet operably connected to the condenser outlet and an outlet;

a vapor-liquid separator having an inlet operably connected to the expansion valve outlet and a liquid outlet and a vapor outlet; and an evaporator having a liquid inlet in a first upper portion of the evaporator, the liquid inlet being operably connected to the liquid outlet of the separator;

the evaporator further including (a) a vapor outlet in a second upper portion of the evaporator, the vapor outlet of the evaporator being operably connected to the compressor inlet;

(b) a liquid pool in the lower portion of the evaporator, and (c) a vapor inlet in the lower portion where the vapor inlet is located below the surface of the liquid pool, the vapor inlet of the evaporator being operably connected to the vapor outlet of the separator.

31. The cooling system of claim 30 wherein the vapor entering the liquid pool is arranged to agitate a lubricant refrigerant mixture comprising the liquid in the pool so as to enhance the vaporization of a refrigerant portion of the mixture and thereby enhance the overall concentration of a lubricant portion of the mixture.

32. The cooling system of claim 31 wherein the evaporator further includes a lubricant portion drain in the lower portion of the evaporator, the drain being operable to remove the highly concentrated lubricant portion, the drain being operably connected to the compressor by conduit and thereby transferring the lubricant rich mixture to the compressor.

33. The cooling system of claim 32 wherein the vapor-liquid separator has a narrowing 'V' shape resembling an axial section of a brilliant-cut diamond.

34. The cooling system of claim 33 wherein the evaporator includes a body of heat transfer tubes, the body of heat transfer tubes having an upper subset of tubes optimized for heat transfer with a thin film, and a lower subset of tubes arranged in the pool and optimized for heat transfer with a thick film.

35. The cooling system of claim 30 wherein the evaporator includes a body of heat transfer tubes, the body of heat transfer tubes having an upper subset of tubes optimized for heat transfer with a thin film, and a lower subset of tubes arranged in the pool and optimized for heat transfer with a thick film.

* * * * *

UNITED STATES PATENT AND TRADEMARK OFFICE
CERTIFICATE OF CORRECTION

PATENT NO. : 5,561,987
DATED : October 8, 1996
INVENTOR(S) : Jon P. Hartfield and Duane F. Sanborn It is certified that error appears in the above-identified patent and that said Letters Patent is hereby corrected as shown below:

Column 2, Line 31, "generator-and" should read --generator and--.

Column 11, Line 21, "two-Phase" should read --two-phase--.

Claim 18, Column 15, Line 53, "claim 18" should read --claim 17--.

Signed and Sealed this

Twenty-fourth Day of December, 1996

Attest:

BRUCE LEHMAN

*Attesting Officer*     *Commissioner of Patents and Trademarks*